United States Patent
Cornell et al.

(10) Patent No.: US 6,560,963 B2
(45) Date of Patent: May 13, 2003

(54) VARIABLE TIMING TO AVOID TURBOCHARGER OVERSPEED WHILE ENGINE BRAKING UNDER DIFFERENT ATMOSPHERIC CONDITIONS

(75) Inventors: Sean O. Cornell, Gridley, IL (US); Scott A. Leman, Eureka, IL (US); David E. Martin, Normal, IL (US); Ronald D. Shinogle, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/742,556

(22) Filed: Dec. 20, 2000

(65) Prior Publication Data
US 2002/0073705 A1 Jun. 20, 2002

(51) Int. Cl.$^7$ .......................... F02D 23/00; F02D 13/04
(52) U.S. Cl. ........................ 60/602; 60/600; 123/321; 123/322; 123/90.15; 123/90.16
(58) Field of Search .................. 60/602, 600, 601, 60/603, 611; 123/321, 322, 90.15, 90.16, 90.17, 90.18; 416/152

(56) References Cited

U.S. PATENT DOCUMENTS

| | | | | |
|---|---|---|---|---|
| 5,142,868 A | * | 9/1992 | Woon et al. | 60/602 |
| 5,437,156 A | * | 8/1995 | Custer | 60/611 |
| 5,442,920 A | * | 8/1995 | Kamel et al. | 60/602 |
| 5,813,231 A | | 9/1998 | Faletti et al. | 60/602 |
| 5,937,807 A | * | 8/1999 | Peters et al. | 123/90.15 |
| 6,062,025 A | * | 5/2000 | Okada et al. | 60/602 |
| 6,089,018 A | * | 7/2000 | Bischoff et al. | 60/602 |
| 6,148,793 A | * | 11/2000 | Faletti et al. | 123/322 |
| 6,256,992 B1 | * | 7/2001 | Lewis, Jr. et al. | 60/611 |

FOREIGN PATENT DOCUMENTS

| | | | | |
|---|---|---|---|---|
| GB | 1357337 A | * | 6/1974 | |
| JP | 401116242 A | * | 10/1987 | 123/198 R |
| JP | 401203601 A | * | 8/1989 | 415/29 |
| JP | 405222930 A | * | 8/1993 | 60/280 |
| JP | 08086203 A | * | 4/1996 | |
| JP | 08165934 A | * | 6/1996 | |

* cited by examiner

Primary Examiner—Thomas Denion
Assistant Examiner—Thai-Ba Trieu
(74) Attorney, Agent, or Firm—Liell & McNeil

(57) ABSTRACT

A method of engine compression release braking with avoidance of turbine overspeed is disclosed. Initially, an electronic control module determines whether a turbine overspeed condition is present. If an overspeed condition is present, then the blow down timing of an engine compression release braking event is advanced. The present invention is particularly applicable to preventing turbine overspeed for vehicles operating at higher altitudes while compression braking.

20 Claims, 2 Drawing Sheets

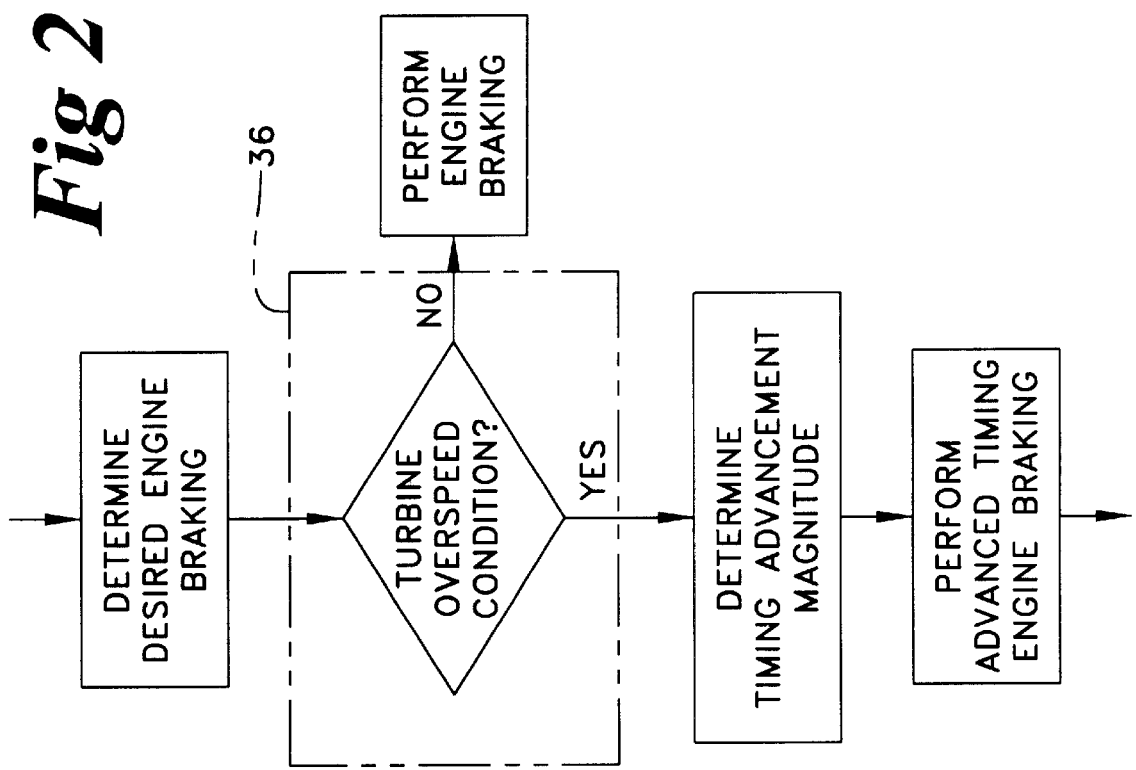
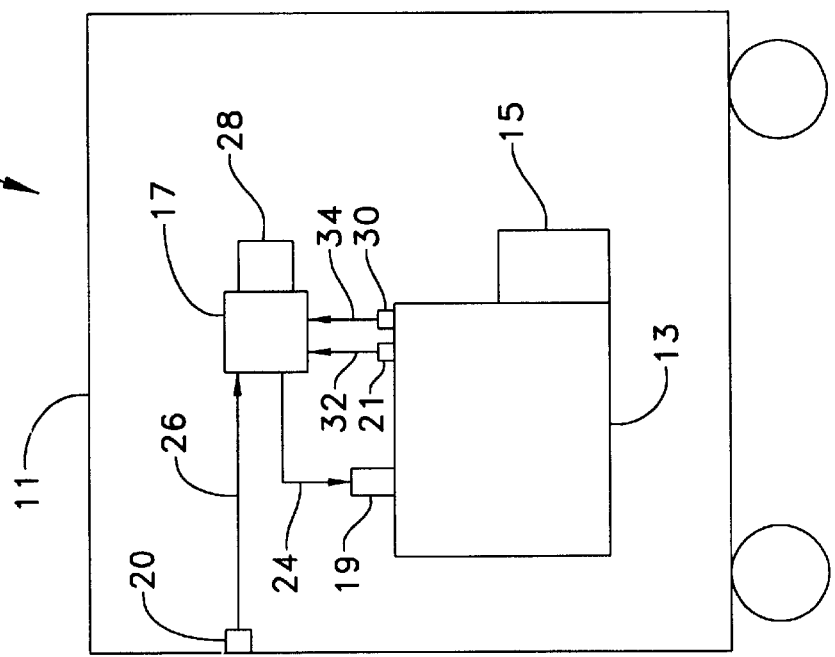

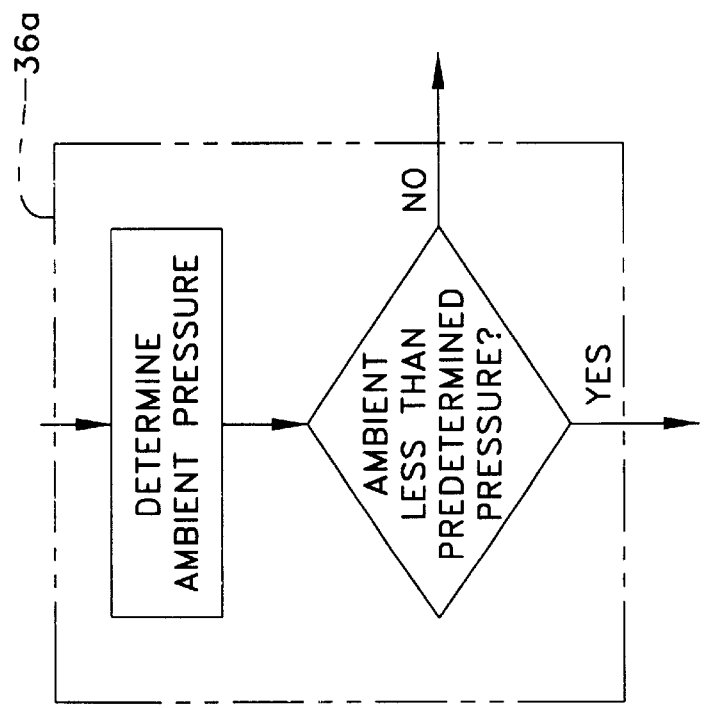

VARIABLE TIMING TO AVOID TURBOCHARGER OVERSPEED WHILE ENGINE BRAKING UNDER DIFFERENT ATMOSPHERIC CONDITIONS

TECHNICAL FIELD

The present invention relates generally to compression release engine braking, and more particularly to an engine braking control strategy that avoids turbine overspeed under various atmospheric conditions.

BACKGROUND ART

Engine compression release brakes are used to assist and supplement wheel brakes in slowing heavy vehicles such as tractor-trailers. Engine brakes are desirable because they help alleviate wheel brake overheating. As vehicle design and technology have advanced, the hauling capacity of tractor-trailers has increased, while at the same time rolling resistance and wind resistance have decreased. Thus, there is a need for advanced engine braking systems in today's heavy vehicles.

As engine braking technology has developed, various strategies have emerged to control the magnitude of the braking horsepower. In one strategy, electronically controlled engine brake actuators allow braking horsepower to be varied by varying the timing of the blow down portion of the braking event. In other words, less than the maximum available braking horsepower can be achieved by advancing the timing of the opening of the exhaust valve, such that blow down occurs before peek pressure is achieved. Another strategy for varying engine braking horsepower is to utilize a variable geometry turbocharger, such as that taught in co-owned U.S. Pat. No. 5,813,231 to Faletti et al. That reference teaches changing the geometry of the turbocharger in order to reduce or increase the pressure in the exhaust manifold to increase or decrease engine braking horsepower, respectively. While these two and other strategies appear sound in controlling engine compression release braking horsepower to some extent, their incorporation into current engine/vehicle designs can sometimes introduce new problems.

For instance, like any device having rotating components, turbochargers are generally designed to operate under some pre-determined speed. Those skilled in the art will recognize that when a engine is not in a power mode but is in a engine braking mode, the turbine is still driven to rotate. Thus, while a turbocharger may be designed to avoid overspeed conditions at any engine powered operating condition, potential turbine overspeed must also be examined with regard to contemplated engine compression release braking under a variety of conditions. As engine braking horsepower continues to be increased with such innovations as two cycle braking and/or two event (boosted) engine braking, potential problems associated with turbine overspeed can become more pronounced.

Another factor that can influence turbine speed is related to the ambient conditions surrounding the turbine. For instance, those skilled in the art have recognized that lower ambient pressures, such as those experienced at higher altitudes, tend to cause a turbine to rotate faster. The present invention is directed to these and other problems associated with engines equipped with both turbochargers and engine compression release brakes.

DISCLOSURE OF THE INVENTION

In one aspect, a method of engine compression release braking with avoidance of turbine overspeed comprises the initial step of determining whether a turbine overspeed condition is present. If a turbine overspeed condition is present, then the blow down timing of the engine compression release braking is advanced.

In another aspect, an electronic control module includes a means for advancing blow down timing during engine compression release braking if a turbine overspeed condition is present.

And still another aspect, a vehicle includes a vehicle housing with an engine attached thereto. The engine includes at least one turbine and at least one engine compression release brake. An electronic control module includes a means for advancing a blow down timing during engine compression release braking if a turbine overspeed condition is present.

BRIEF DESCRIPTION OF THE DRAWINGS

FIG. 1 is a schematic illustration of an vehicle according to the present invention;

FIG. 2 is a logic flow diagram for implementing the methodology of the present invention;

FIG. 3a is an expanded portion of the flow diagram of FIG. 2 showing an open loop version of the present invention; and FIG. 3b is an expanded portion of the flow diagram of FIG. 2, except showing a closed loop version of the present invention.

BEST MODE FOR CARRYING OUT THE INVENTION

Referring to FIG. 1, a vehicle 10, which is typically a tractor-trailer or some other heavy vehicle, includes a vehicle housing 11. An engine 13, which is preferably a diesel engine, is attached to vehicle housing 11 in a conventional manner. Included with engine 13 are at least one engine compression release brake 19 and a turbocharger that includes a turbine 15. Engine 13 is controlled in a conventional manner with an electronic control module 17, which receives various sensor inputs and transmits control signals to various engine components in a conventional manner. For instance, electronic control module 17 receives ambient pressure data via a communication line 26 from an ambient pressure sensor 20. Apart from numerous other sensory inputs, electronic control module 17 preferably is connected to receive data from an intake mass flow rate sensor 21 via a communication line 32, and an intake manifold sensor 30 via a communication line 34. The electronic control module processes this sensory data information, often by accessing stored data from a memory storage unit 28, to generate control signals for various sub-systems, such as a fuel injection system. In the preferred embodiment, electronic control module 17 also controls the operation of the engine compression release brake(s) 19 via a communication line 24.

In most instances, the turbocharger for an individual engine is designed such that turbine overspeed conditions should not be encountered regardless of ambient or engine operating conditions. When an engine is also equipped with compression release exhaust brakes, potential turbine overspeed problems can arise under various conditions. For instance, when ambient pressures are relatively low, such as when the vehicle is operating at altitude, the potential for undesirable turbine overspeed is present. In addition, potential turbine overspeed can be a consequence of two cycle versus four cycle engine compression release braking, and further when two event or boosted engine compression release braking techniques are exploited. In both instances, pressure waves arrive at the turbine more frequently, with more power, or both. Nevertheless, those skilled in the art will appreciate that the horsepower of engine compression release braking is strongly a function of the timing of when the cylinder blow down event occurs. For instance, maximum braking horsepower is achieved when blow down occurs near piston top dead center. Any advanced timing of that blow down event naturally results in less braking horsepower and a decrease in the energy sent to the turbine during the blow down event.

Referring to FIG. 2, a flow diagram according to the preferred method of the present invention is illustrated. In practice, the logic of the flow diagram would be included in suitable software programming incorporated into the electronic control module 17 (FIG. 1). In the initial step, the desired magnitude of engine braking is determined. This determination will be a function of known factors such as engine speed, vehicle speed, brake pedal position, etc. The next step in the methodology is to determine whether a turbine overspeed condition is present. This determination 36 can be accomplished in a number of ways including the open looped determination 36a (FIG. 3a) and the closed loop determination performed according to determination 36b of FIG. 3b. The purpose of the turbine overspeed condition determination is generally to ascertain whether the turbine speed is above some predetermined maximum turbine speed. Those skilled in the art will appreciate that this determination could be easily made if a turbine speed sensor were included that supplied turbine speed data continuously to the electronic control module. However, turbine speed sensors are not ordinarily included with most engine designs. Nevertheless, the present invention contemplates the usage of a turbine speed sensor to be within the scope the present invention for use in conducting the turbine overspeed determination 36 of FIG. 2.

If no turbine overspeed condition is detected, then the electronic control module performs engine compression release braking in accord with the desired engine braking. If a turbine overspeed condition is detected, then the engine braking blow down timing is advanced to a point that does not exacerbate the turbine speed, and preferably to a point that results in a reduction of turbine speed for subsequent engine braking cycles. Those skilled in the art will appreciate that the magnitude of the blow down timing advancement can be reliably determined through testing and the preparation of appropriate tables relating to the same. After the timing advancement magnitude is determined, the ECM then performs an advanced timing engine braking event.

Referring to FIG. 3a, an open loop turbine overspeed condition determination 36a might be accomplished simply by sensing ambient pressure and then comparing that ambient pressure to a predetermined pressure. For instance, in a case where a turbine overspeed condition is present only above sea level, the electronic control module would first determine ambient pressure, preferably by using an appropriate ambient pressure sensor 20. This pressure is then compared to a predetermined pressure, which may correspond to sea level pressure. Thus, in the open loop determination 36a, turbine overspeed condition is detected simply by comparing ambient pressure to a predetermined pressure, such as sea level pressure.

In such a case, the magnitude of any timing advancement could be a simple function of the difference between the ambient pressure and the predetermined pressure. For example, if the vehicle were operating at a 10,000 foot altitude, the ECM might calculate a blow down timing advancement on the order of about 10°. The magnitude of the timing advancement could be based upon a look up table, or possibly a simple equation, based upon previous testing. Those skilled in the art will appreciate that this strategy provides an open loop control against turbine overspeed since turbine speed is never determined, but turbine overspeed is nevertheless prevented since previous testing is relied upon to determine blow down timing advancements necessary to prevent turbine overspeed. The timing advancements preferably reduce turbine speed back to acceptable levels.

In the turbine overspeed condition determination 36b of FIG. 3b, the method can be considered closed looped since several sensed variables are used to estimate the actual turbine speed. In particular, this strategy utilizes available sensor inputs to estimate the actual turbine speed in a turbine speed determination step 38. Those skilled in the art will appreciate that when the various specifications of a given turbocharger are known, one can estimate the turbine speed as a function of ambient pressure, intake mass flow rate and intake pressure. The step 38 of determining turbine speed can be accomplished based upon accessing a three dimensional look up table that is a function of ambient pressure, intake mass flow rate and intake pressure. This look up table would preferably be generated through testing and would be stored in a memory storage location 28 accessible to the electronic control module (FIG. 1).

In this closed loop strategy, the estimated turbine speed is compared to a predetermined turbine speed. If the turbine speed is below the predetermined speed, then the engine compression release braking is performed according to the desired braking demanded. If the turbine speed is high, then a blow down timing advancement is determined, and an advanced timing engine braking event is performed. In the closed loop strategy of FIG. 3b, the magnitude of the blow down timing advancement is preferably calculated as a function of the difference between the estimated turbine speed and the predetermined turbine speed. For instance, one could expect the magnitude of the timing advancement to increase as the difference between the estimated turbine speed and the predetermined turbine speed increases. Those skilled in the art would appreciate that this latter closed loop strategy likely provides a much more accurate control against turbine overspeed, but does so at the cost of including more sensors, more data processing, and more pre-stored data than that required in the simple correction strategy based only upon ambient pressure.

INDUSTRIAL APPLICABILITY

The present invention finds potential application in any vehicle having an engine that includes a turbocharger and at least one engine compression release brake. In most of these applications, no additional hardware is needed in order to implement the invention. Instead, modest additions to the electronic control module programming can be implemented to accomplish the method of the present invention. Furthermore, the amount of ECM reprogramming can be varied depending upon the desired accuracy of the results. Those skilled in the art will appreciate that any blow down timing advancement correspondingly results in less braking horsepower. Thus, implementation of the present invention implicitly requires a compromise between desired braking horsepower and a desire to avoid turbocharger damage through turbine overspeed. The different open and closed loop strategies disclosed to perform the invention necessarily have an influence on this compromise. For instance, the open looped strategy that relies simply on measuring ambient pressure and comparing the same to a predetermined pressure would likely result in establishing blow down timing advancements that are larger than needed in order to have a desired level of confidence that the strategy would be successful even in the presence of other variables that could influence turbine speed.

Thus, those skilled in the art will appreciate that the present invention could be implemented in a wide array of sophistication levels, depending upon the desired accuracy of the result. For instance, those skilled in the art will appreciate that the more simpler approach illustrated in FIG. 3a that relies upon measuring ambient pressure might result in unduly limiting the engine braking horsepower. Nevertheless, it is likely that in most instances, the maximum blow down timing advance would rarely exceed about 10° of crank angle, even at relatively extreme altitudes such as 10,000 feet.

In the more sophisticated strategy, turbine speed is actually estimated, and the blow down timing advancement could be calculated as a function of current turbine speed. Those skilled in the art will appreciate that such a more sophisticated strategy could be simplified by the inclusion of a turbine speed sensor in order to avoid data processing strategies for estimating turbine speed based upon available sensor data. In addition, those skilled in the art will appreciate that an altitude sensor could be substituted for the ambient pressure sensor illustrated with regard to the preferred embodiment. It is anticipated that the curve of blow down timing advancement would rise from sea level in a exponential manner similar to the exponential manner in which air pressure drops with altitude.

It should be understood that the above description is intended for illustrative purposes only, and is not intended to limit the scope of the present invention in any way. For instance, while the present invention has been illustrated as using an ambient pressure sensor, those skilled in the art will appreciate that an altitude sensor could be substituted. In addition, while the invention has been illustrated as using available hardware, those skilled in the art will appreciate that the implementation of the present invention could be simplified in some instances by the inclusion of an additional sensor, such as a turbine speed sensor. Those skilled in the art will appreciate that other available sensor inputs could also be utilized to implement the present invention at some level of sophistication. Thus, those skilled in the art will appreciate that other aspects, objects and advantages of this invention can be obtained from a study of the drawings, the disclosure, and the appended claims.

What is claimed is:

1. A method of engine compression release braking with avoidance of turbine overspeed, comprising the steps of:
   determining whether a turbine overspeed condition is present;
   if a turbine overspeed condition is present, then advancing a blow down timing during engine compression release braking.

2. The method of claim 1 wherein said determining step includes a step of sensing ambient pressure.

3. The method of claim 2 wherein said determining step includes the steps of:
   sensing intake mass flow rate and intake manifold pressure; and
   estimating whether a turbine overspeed condition is present as a function of ambient pressure, intake mass flow rate and intake manifold pressure.

4. The method of claim 3 wherein said estimating step includes a step of retrieving a value from a look-up table.

5. The method of claim 3 wherein said advancing step includes a step of determining a timing advancement magnitude as a function of ambient pressure, intake mass flow rate and intake manifold pressure.

6. The method of claim 2 wherein said determining step includes a step of comparing ambient pressure to a predetermined pressure.

7. The method of claim 6 wherein said advancing step includes a step of determining a timing advancement magnitude as a function of a difference between the ambient pressure and the predetermined pressure.

8. The method of claim 1 wherein said determining step includes the step of estimating a variable that is correlated to altitude.

9. An electronic control module programmed with:
   means for processing sensory data; and
   means for advancing a blow down timing during engine compression release braking if a turbine overspeed condition is sensed.

10. The electronic control module programmed of claim 9 wherein said means for processing includes a means for determining whether a turbine overspeed condition is present.

11. The electronic control module programmed of claim 10 wherein said means for determining includes a means for estimating ambient pressure.

12. The electronic control module programmed of claim 11 wherein said means for determining includes a means for comparing said ambient pressure to a predetermined pressure.

13. The electronic control module programmed of claim 11 wherein said means for processing includes:
   means for estimating intake mass flow rate;
   means for estimating intake manifold pressure; and
   means for estimating turbine speed as a function of said ambient pressure, said intake mass flow rate and said intake manifold pressure.

14. The electronic control module programmed of claim 13 wherein said means for estimating turbine speed includes a look-up table of turbine speed as a function of said ambient pressure, said intake mass flow rate and said intake manifold pressure.

15. The electronic control module programmed of claim 11 wherein said means for advancing includes a means for calculating a timing advancement magnitude.

16. A vehicle comprising:
   a vehicle housing;
   an engine attached to said vehicle housing and including at least one turbine and at least one engine compression release brake; and
   an electronic control module having means for advancing a blow down timing during engine compression release braking if a turbine overspeed condition is present.

17. The vehicle of claim 16 including at least one of an altitude sensor and an ambient pressure sensor attached to said vehicle housing in communication with said electronic control module.

18. The vehicle of claim 17 including an intake mass flow rate sensor in communication with said electronic control module; and
   an intake manifold pressure sensor in communication with said electronic control module.

19. The vehicle of claim 18 including a look-up table of turbine speed as a function ambient pressure, intake mass flow rate and intake manifold pressure stored at a location accessible to said electronic control module.

20. The vehicle of claim 17 wherein said electronic control module includes a means for calculating a timing advancement magnitude.

* * * * *